US010877793B2

(12) United States Patent
Tsirkin et al.

(10) Patent No.: US 10,877,793 B2
(45) Date of Patent: *Dec. 29, 2020

(54) EXTENDING THE BASE ADDRESS REGISTER BY MODIFYING THE NUMBER OF READ-ONLY BITS ASSOCIATED WITH A DEVICE TO BE PRESENTED TO A GUEST OPERATING SYSTEM

(71) Applicant: Red Hat Israel, Ltd., Ra'anana (IL)

(72) Inventors: Michael S. Tsirkin, Yokneam Illit (IL); Paolo Bonzini, Turate (IT)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,921

(22) Filed: Feb. 25, 2019

(65) Prior Publication Data

US 2019/0188028 A1 Jun. 20, 2019

Related U.S. Application Data

(63) Continuation of application No. 14/553,109, filed on Nov. 25, 2014, now Pat. No. 10,241,817.

(51) Int. Cl.
*G06F 9/455* (2018.01)

(52) U.S. Cl.
CPC ........ *G06F 9/45558* (2013.01); *G06F 9/4555* (2013.01); *G06F 9/45545* (2013.01); *G06F 2009/45579* (2013.01); *G06F 2009/45595* (2013.01)

(58) Field of Classification Search
CPC . G06F 2009/45579; G06F 2009/45595; G06F 9/45545; G06F 9/4555; G06F 9/45558
See application file for complete search history.

(56) References Cited

U.S. PATENT DOCUMENTS

| 3,818,460 | A | * | 6/1974 | Beard | ........................ | G06F 9/32 |
| | | | | | | 711/2 |
| 5,426,748 | A | * | 6/1995 | Brenza | ................ | G06F 12/0292 |
| | | | | | | 711/2 |
| 5,734,858 | A | * | 3/1998 | Patrick | ................ | G06F 12/1081 |
| | | | | | | 711/2 |
| 7,613,847 | B2 | | 11/2009 | Kjos et al. | | |
| 7,617,340 | B2 | | 11/2009 | Gregg | | |

(Continued)

OTHER PUBLICATIONS

No Author, "29.18 Devices," Red Hat Customer Portal, retrieved from the Internet on Aug. 28, 2014, 68 pages, World Wide Web, access.redhat.com/documentation/en-US/Red_Hat_Enterprise_Linux/7/html/Virtualization_Deployment_and_Administration_Guide/sect-Manipulating_the_domain_xml-Devices.html.

(Continued)

*Primary Examiner* — Jorge A Chu Joy-Davila
(74) *Attorney, Agent, or Firm* — Womble Bond Dickinson (US) LLP

(57) ABSTRACT

A hypervisor associates a combined register space with a virtual device to be presented to a guest operating system of a virtual machine, the combined register space comprising a default register space and an additional register space. Responsive to detecting an access of the additional register space by the guest operating system of the virtual machine, the hypervisor performs an operation on behalf of the virtual machine, the operation pertaining to the access of the additional register space.

20 Claims, 6 Drawing Sheets

(56) References Cited

U.S. PATENT DOCUMENTS

| | | | |
|---|---|---|---|
| 7,647,438 B1* | 1/2010 | Norrie | G06F 7/24 |
| | | | 370/351 |
| 7,979,592 B1 | 7/2011 | Pettey et al. | |
| 8,527,673 B2 | 9/2013 | Mahalingam et al. | |
| 8,973,144 B2 | 3/2015 | Dang | |
| 2004/0073765 A1* | 4/2004 | Arimilli | G06F 12/0653 |
| | | | 711/202 |
| 2004/0236923 A1 | 11/2004 | Munguia et al. | |
| 2005/0114855 A1 | 5/2005 | Baumberger | |
| 2005/0246453 A1 | 11/2005 | Erlingsson et al. | |
| 2008/0072223 A1 | 3/2008 | Cowperthwaite et al. | |
| 2010/0332910 A1 | 12/2010 | Ali et al. | |
| 2012/0167082 A1 | 6/2012 | Kumar et al. | |
| 2013/0125119 A1 | 5/2013 | Vipat et al. | |
| 2013/0145051 A1 | 6/2013 | Kegel et al. | |
| 2013/0174148 A1 | 7/2013 | Amit et al. | |
| 2015/0286585 A1 | 10/2015 | Caraccio et al. | |
| 2018/0019875 A1 | 1/2018 | Sahita et al. | |

OTHER PUBLICATIONS

No Author, "Domain XML Format," libvirt.org, retrieved from the Internet on Aug. 28, 2014, 36 pages, World Wide Web, libvirt.org/formatdomain.html.

Abel Gordon et al. "ELI: Bare-Metal Performance for I/O Virtualization," ASPLOS' 2012, Mar. 3-7, 2012, pp. 411-422, ACM, London, England, UK, World Wide Web, researcher.watson.ibm.com/researcher/files/il-ABELG/eli_asplos12.pdf.

* cited by examiner

EXTENDING THE BASE ADDRESS REGISTER BY MODIFYING THE NUMBER OF READ-ONLY BITS ASSOCIATED WITH A DEVICE TO BE PRESENTED TO A GUEST OPERATING SYSTEM

RELATED APPLICATIONS

The present application claims the benefit of U.S. patent application Ser. No. 14/553,109, issued as U.S. Pat. No. 10,241,817, titled "PARAVIRTUALIZED ACCESS FOR DEVICE ASSIGNMENT BY BAR EXTENSION," filed Nov. 25, 2014, the entire contents of which are herein incorporated by reference.

TECHNICAL FIELD

The present disclosure if generally related to computer systems, and more particularly, to device assignment its virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operation system."

Physical devices, such as network devices or video cards, can be made available to guests by the hypervisor by a process known as device assignment. The hypervisor can create a virtual device within the guest that is associated with the physical device so that any access of the virtual device can be forwarded to the physical device by the hypervisor with little or no modification.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
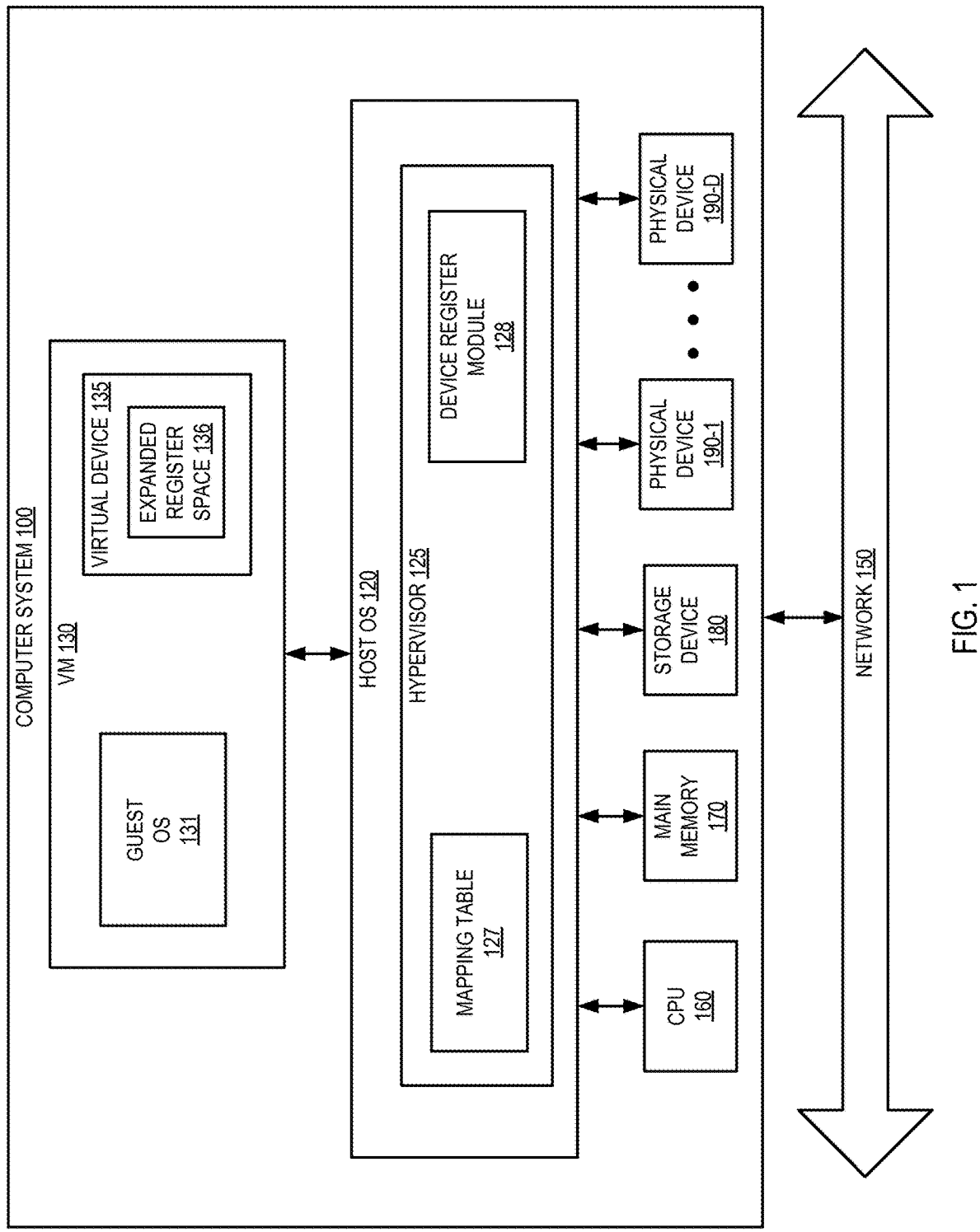
FIG. 1 depicts a high-level component diagram of an example computer system architecture, in accordance with one or more aspects of the present disclosure.

Described herein are methods and systems by which a hypervisor can expand configuration space associated with a physical device (e.g., network devices, video cards, etc.) when assigned to a guest operating system of a virtual machine. Typically a hypervisor can create a virtual device within the guest that is associated with a physical device so that any access of the virtual device can be forwarded to the physical device by the hypervisor with little or no modification. For some PCI devices, such as Integrated Graphics Devices (IGD) devices (e.g., video cards built into the microprocessor of a computer system), this can be insufficient since the guest driver may need access not only the PCI device itself but other system resources as well (e.g., a PCI Host Bridge, etc.). A hypervisor should not allow the guest to execute commands that affect the physical PCI host bridge, which may require modification of the device driver for the assigned device to perform these commands through alternative mechanisms (known as "para-virtualization"). An alternative can be to modify a device driver for the device to access a register that is unused on the physical device (known as "para-virtualization"). However, with many physical devices, available registers may be limited, which can result in significant constraints on adding para-virtual registers to the register space that can be made available to a guest.

Aspects of the present disclosure address the above noted deficiency by expanding the register space associated with a virtual device when presented to the guest during device assignment. In an illustrative example, a hypervisor can assign a physical device to a guest operating system of a virtual machine. In certain implementations, the physical device may be an Integrated Graphics Device (IGD) device. Assigning a physical device to a guest operating system can comprise creating a virtual device associated with the physical device that is accessible by the guest operating system of a virtual machine. Any access of the virtual device by the guest operating system of the virtual machine can be forwarded to the physical device by the hypervisor with little or no modification.

The hypervisor may identify the size of a default register space of the physical device to be assigned to a guest operating system of a virtual machine. In certain implementations, the hypervisor can determine the size of the register space using the base address register (BAR) of a PCI device. The hypervisor may read the contents of the BAR of the physical device and determine the number of read only bits (e.g., bits in the register that are set to '0') in the BAR. The number of read only bits in the BAR may indicate the default size of the register space. For example, 10 read only bits in the BAR (e.g., bits 0-9), may indicate a 1 kilobyte default register space associated with the physical device.

The hypervisor may extend the size of the register space and associate the extended size with the virtual device that is presented to the guest operating system of the virtual machine. In certain implementations, the hypervisor can extend the register space by identifying an additional register space to combine with the default register space. The hypervisor may use the information from the BAR of the physical device to extend the register space, determining a second number of read only bits in view of the number of read only bits in the BAR of the virtual device. The hypervisor may increase the number of read only bits in the BAR of the virtual device to increase the size of the combined register space. For example, if there were initially 10 read only bits in the BAR (e.g., bits 0-9), designating a 1 kilobyte default register space, the hypervisor may change one or more higher bits of the BAR from read/write to read only (e.g., bits 10, 11, etc.) to increase the combined register space size. A modified BAR with 11 read only bits (e.g., bits 0-10) can provide a total combined register space of 2 kilobytes (a 1 kilobyte default register space with an additional extended register space of 1 kilobyte), a BAR with 12 read only bits (e.g., bits 0-11) can provide a total combined register space of 4 kilobytes (a 1 kilobyte default space with an additional extended register space of 3 kilobytes), etc.

Once the extended size of the register space has been determined, the hypervisor may then combine the additional extended register space with the default register space using a mapping table, which can be stored in a data structure in hypervisor accessible memory such as an array, a hash table, or any similar manner. The hypervisor can use the mapping table to associate the additional extended register space, beyond that which is specified in the BAR of the physical device, with processing logic for para-virtual registers of the virtual device. For example, the processing logic may associate the entire additional extended space with another area of physical memory (RAM), with shared RAM (e.g., so accesses can be reflected in the hypervisor or in a guest operating system of another virtual machine), with an additional physical device available to the host, with a hypervisor function that may be executed upon request of the guest operating system, etc. In some implementations, the mapping table may map each address in the additional extended register space to a separate hypervisor functionality or device.

The hypervisor may then associate the combined register space with the virtual device to be presented to the guest operating system. The hypervisor may associate the combined space with the virtual device using the mapping table, the memory page table, or in any similar manner. Once the combined register space has been associated with the network device and enabled by the guest operating system of the virtual machine, the hypervisor may detect any access of the additional extended register space by the guest operating system of the virtual machine. In one illustrative example, the hypervisor may determine the starting address of the additional extended register space. The hypervisor may then identify one or more memory pages at the starting address and designate that page or pages as not present. For example, the hypervisor may modify the valid bit of the page table entry for the memory page(s) within the memory page table of the host operating system. If the guest attempts to access any of the memory pages in the extended register space that are designated as not present, a fault can be generated, thereby notifying the hypervisor of the access by transferring control to the hypervisor.

Responsive to detecting an access of the additional extended space by the guest operating system, the hypervisor may perform an operation on behalf of the guest operating system of the virtual machine. For example, the hypervisor may execute a hypervisor instruction on behalf of the guest, communicate with another device available to the host on behalf of the guest operating system, or the like.

Aspects of the present disclosure are thus capable of providing expanded register space to a guest for communication with a virtual device. More particularly, aspects of the present disclosure can provide additional register space to a guest during device assignment without requiring knowledge of the register space of the physical devices, and thereby alleviating maintenance constraints imposed upon the hypervisor by rapidly-evolving hardware.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing Wits (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more physical devices 190-1 through 190-D, where D is a positive integer (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 150 may be a private network (e.g., local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 may additionally comprise one or more virtual machine (VM) 130, and host operating system (OS) 120. VM 130 is a software implementation of a machine that executes programs as though it were an actual physical machine. Host OS 120 manages the hardware resources of the computer system and provides functions such as inter-process communication, scheduling, memory management, and so forth.

VM 130 may comprise a guest operating system (OS) 131 that handles the execution of applications within the virtual machine, and virtual device 135 that is associated with a physical device 190-1. Virtual device 135 may comprise expanded register space 136 that may combine a default register space with an additional extended register space presented to the virtual machine during assignment of a physical device 190-1. It should be noted that although, for simplicity, a single virtual machine 130 is depicted in FIG. 1, computer system 100 may host a plurality of VMs 130.

Host OS 120 may comprise a hypervisor 125, which provides a virtual operating platform for VMs 130 and manages their execution. Hypervisor 125 may comprise mapping table 127, as well as device register module 128. It should be noted that in some alternative implementations, hypervisor 125 may be external to host OS 120, rather than embedded within host OS 120, or may replace host OS 120. Device register module 128 can manage extending the register space associated to physical devices 190-1 through 190-D which can be subsequently assigned to VM 130, as described in detail below with respect to FIGS. 3-5.

Hypervisor 125 can use mapping table 127 to store cross-reference information regarding that associated an expanded BAR size with an additional extended register space. Hypervisor 125 may store a unique identifier that is associated with expanded register space, along with an identifier for the associated physical device 190 for use by device register module 128. Mapping table 127 may be a memory location within hypervisor 125. Alternatively, mapping table 127 may be written to a location in storage device 180.

Figure 2:
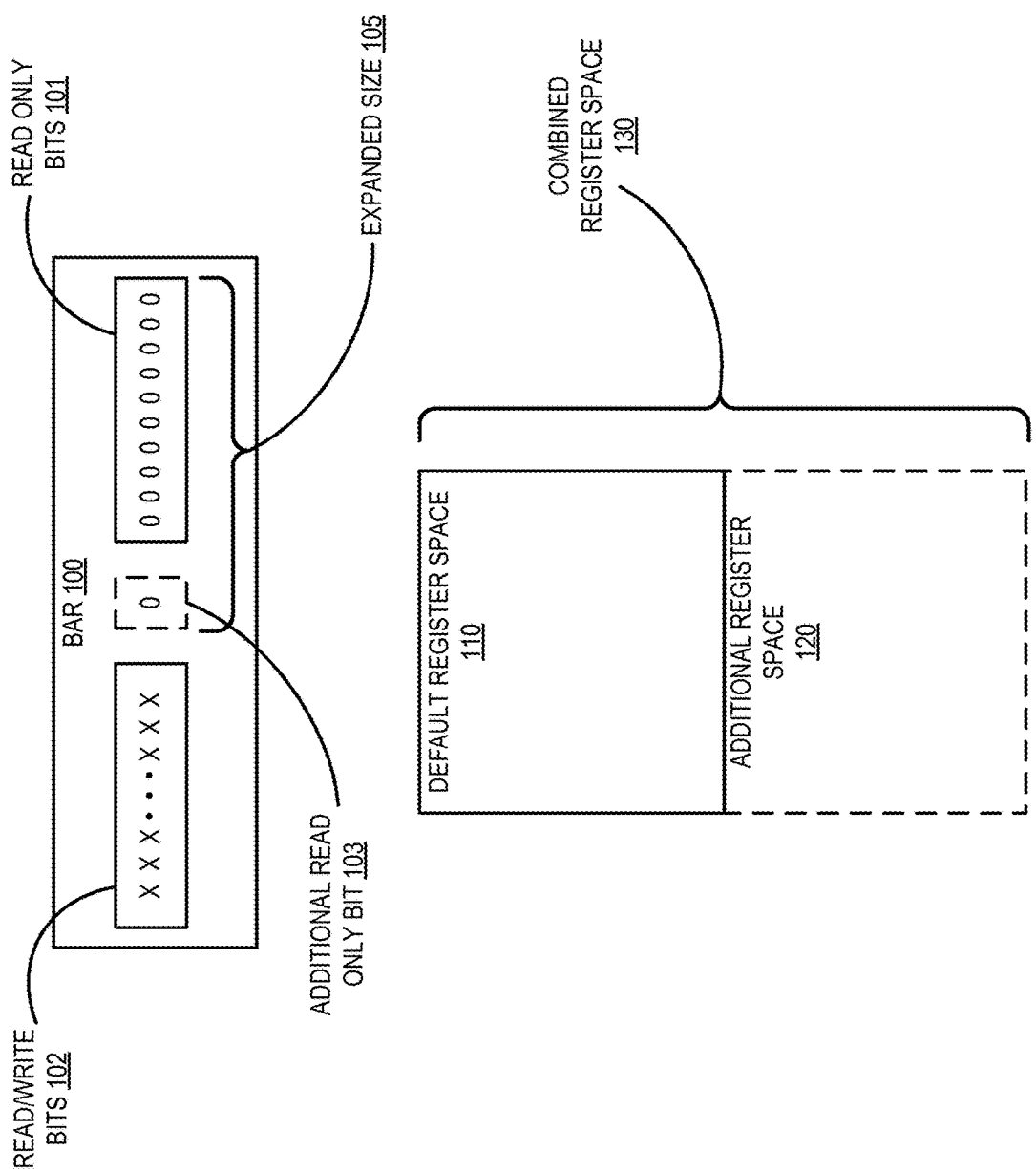
FIG. 2 depicts a block diagram of a base address register and Peripheral Component Interconnect (PCI) device register space, in accordance with one or more aspects of the present disclosure.

FIG. 2 depicts a block diagram of a base address register and PCI device register space, in accordance with one or more aspects of the present disclosure. As shown in FIG. 2, base address register (BAR) 100 can comprise read only bits 101, read/write bits 102, and additional read only bit 103. BAR 100 may be associated with a physical PCI device such as physical devices 190-1 through 190-D of FIG. 1, or a virtual PCI device such as virtual device 135 of FIG. 1. BAR 100 can be used to determine the size of a register space for the PCI device, according to the exemplary process flow described below in connection with FIGS. 3-5.

Read only bits 101 can be used to identify the default size of the register space for the PCI device. A hypervisor, such as hypervisor 125 of FIG. 1, may read the contents of BAR 100 to determine the number of read only bits in read only bits 101 (e.g., bits in the register that are set to '0') in BAR 100. As shown, 10 read only bits are present in BAR 100 indicating a 1 kilobyte default register space associated with the network device.

The hypervisor may extend the size of the register space associated with a virtual PCI device by increasing the number of read only bits in BAR 100. Additional read only bit 103 increases the number of read only bits in BAR 100 from 10 to 11, which can provide, a combined register space of 2 kilobytes. Read/write bits 102 comprise the remainder of the bits available in BAR 100.

Default register space 110 comprises the 1 kilobyte default register space associated with BAR 100 prior to modification by the hypervisor. Additional register space 120 comprises the additional 1 kilobyte extended register space associated with the addition of additional read only bit 103 to BAR 100. Combined register space 130 comprises the 1 kilobyte default register space 110 and 1 kilobyte additional register space 120 for a total register space of 2 kilobytes for the virtual PCI device that may be presented to the guest operating system of a virtual machine as described in detail below with respect to FIGS. 3-5.

Figure 3:
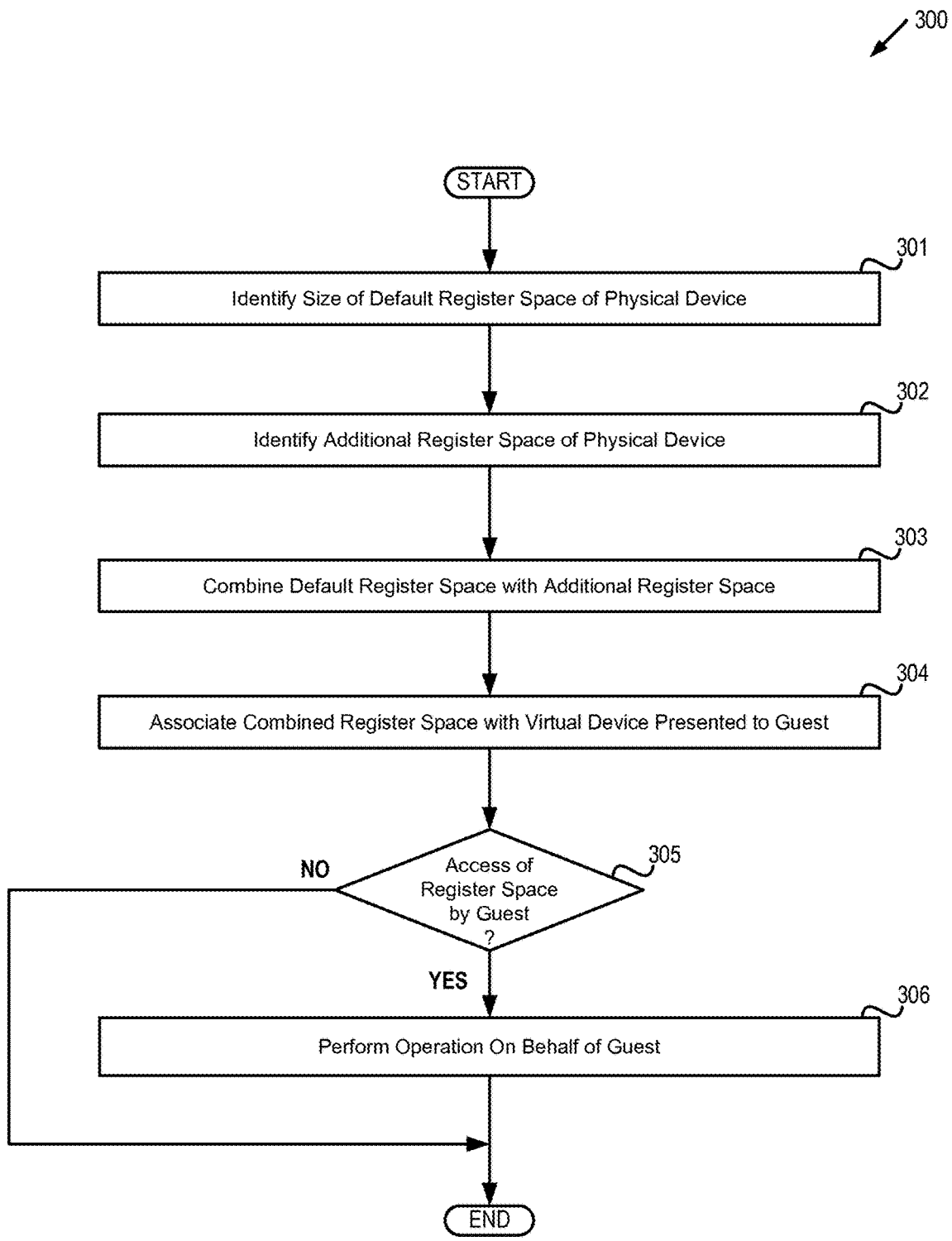
FIG. 3 depicts a flow diagram of a method for assigning an expanded register space to a virtual device, in accordance with one or more aspects of the present disclosure.

FIG. 3 depicts a flow diagram of an example method 300 for presenting an expanded register space to a virtual PCI device. The method may be performed by processing logic that may comprise hardware (circuitry, dedicated logic, etc.), software (such as is run on a general purpose computer system or a dedicated machine), or a combination of both. In one illustrative example, method 300 may be performed by device register module 128 of hypervisor 125 in FIG. 1. Alternatively, some or all of method 300 might be performed by another component or module. It should be noted that blocks depicted in FIG. 3 could be performed simultaneously or in a different order than that depicted.

At block 301, processing logic identifies the size of a default register space of a physical device to be assigned to a guest operating system of a virtual machine. In certain implementations, processing logic can determine the size of the register space using the base address register (BAR) of a PCI device. Processing logic may read the contents of the BAR of the physical device and determine the number of read only bits (e.g., bits in the register that are set to '0') in the BAR. The number of read only bits in the BAR indicates the default size of the register space. For example, 10 read only bits in the BAR (e.g., bits 0-9) indicates a 1 kilobyte default register space associated with the network device.

At block 302, processing logic identifies an additional register space of a virtual device to be presented to the guest operating system of the virtual machine. Processing logic may use the information from the BAR of the physical device to extend the register space, determining a second number of read only bits in view of the number of read only bits in the BAR of the physical device. Processing logic may increase the number of read only bits in the BAR of the physical device to increase the size of the register space. For example, if there were initially 10 read only bits in the BAR (e.g., bits 0-9), designating a 1 kilobyte default register space, processing logic may change one or more higher bits of the BAR from read/write to read only (e.g., bits 10, 11, etc.) to increase the register space size. A modified BAR with 11 read only bits (e.g., bits 0-10) can provide a register space of 2 kilobytes (extending the register space by 1 kilobyte), a BAR with 12 read only bits (e.g., bits 0-11) can provide a register space of 4 kilobytes (extending the register space by 3 kilobytes), etc.

At block 303, processing logic combines the default register space with the additional register space. The additional extended register space may be combined with the default register space using a mapping table, which can be stored in a data structure in hypervisor accessible memory such as an array, a hash table, or any similar manner. Processing logic can use the mapping table to associate the additional extended register space, beyond that which is specified in the BAR, with para-virtual registers, granting the guest additional register space for communications with that particular virtual device. For example, processing logic may map the additional extended space to another area of physical memory (RAM), to shared RAM (e.g., so accesses can be reflected in the hypervisor or in another guest), to an additional physical device available to the host, to a hypervisor function that may be executed upon request of the guest operating system, etc. In some implementations, the mapping table may map each address in the additional extended register space to a separate hypervisor functionality or device.

At block 304 processing logic associates the combined register space with the virtual device presented to the guest operating system. Processing logic may associate the combined space with the virtual device using the mapping table, the memory page table, or in any similar manner. At block 305, processing logic determines whether the guest operating system has accessed the additional register space. If so, and processing logic has detected an access, execution continues to block 306. Otherwise the method of FIG. 3 ends. In one illustrative example, processing logic may determine the starting address of the additional extended register space when the guest operating system enables the combined space. The hypervisor may then identify one or more memory pages at the starting address and designate that page or pages as not present. For example, processing logic may modify the valid bit of the page table entry for the memory page(s) within the memory page table of the host operating system. If the guest attempts to access any of the memory pages in the extended register space that are designated as not present, a fault can be generated, thereby notifying the processing logic of the access.

At block 306, processing logic performs an operation on behalf of the guest operating system of the virtual machine. For example, the hypervisor may execute a hypervisor instruction on behalf of the guest, communicate with another device available to the host on behalf of the guest operating system, or the like. After block 306, the method of FIG. 3 terminates.

Figure 4:
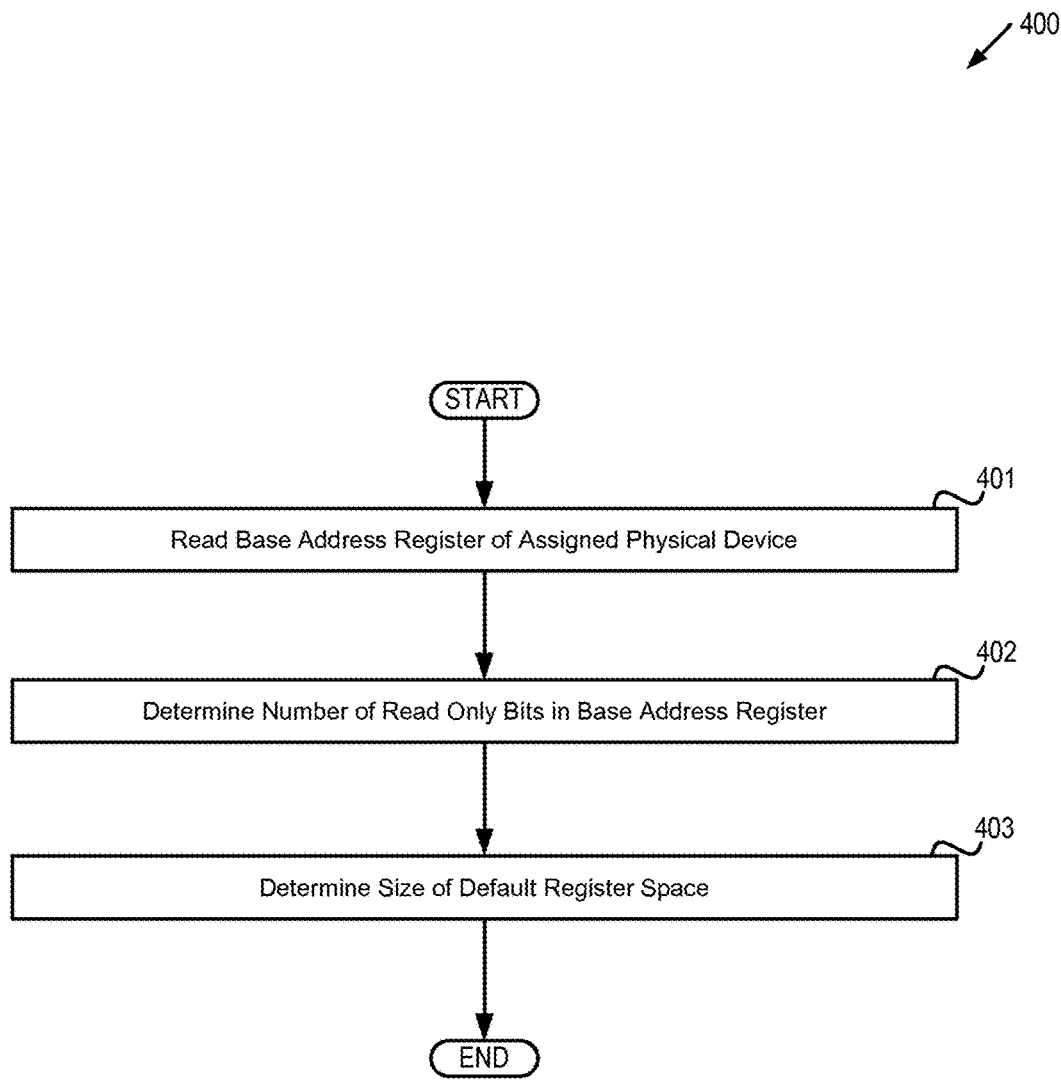
FIG. 4 depicts a flow diagram of a method for identifying the size of the default register space associated with a physical device, in accordance with one or more aspects of the present disclosure.

FIG. 4 depicts a flow diagram of an example method 400 for identifying the size of the default register space associated with a physical device. The method may be performed by processing logic that may comprise hardware (circuitry, dedicated logic, etc.), software (such as is run on a general purpose computer system or a dedicated machine), or a combination of both. In one illustrative example, method 400 may be performed by device register module 128 of hypervisor 125 in FIG. 1. Alternatively, some or all of method 400 might be performed by another component or module. It should be noted that blocks depicted in FIG. 4 could be performed simultaneously or in a different order than that depicted.

At block 401, processing logic reads the base address register of the physical device. At block 402, processing logic determines the number of read only bits in the base address register of the physical device (e.g., bits in the register that are set to '0'). At block 403, processing logic determines the size of the default register space for the physical device. The number of read only bits in the BAR may indicate the default size of the register space. For example, 10 read only bits in the BAR (e.g., bits 0-9), may indicate a 1 kilobyte default register space associated with the physical device. After block 403, the method of FIG. 4 terminates.

Figure 5:
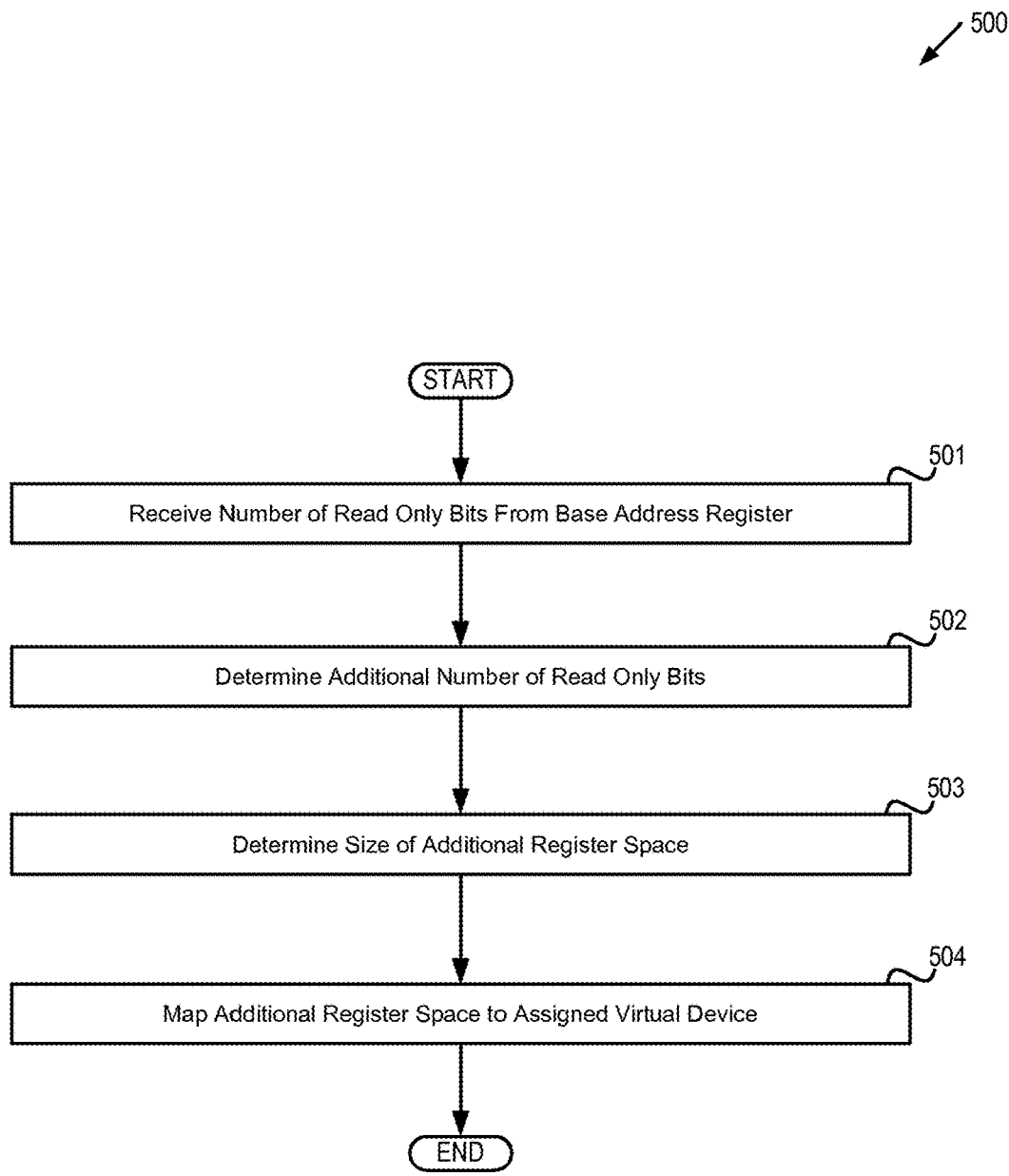
FIG. 5 depicts a flow diagram of a method for identifying an additional register space for a virtual device, in accordance with one or more aspects of the present disclosure.

FIG. 5 depicts a flow diagram of an example method 500 for identifying an additional register space for a virtual device. The method may be performed by processing logic that may comprise hardware (circuitry, dedicated logic, etc.), software (such as is run on a general purpose computer system or a dedicated machine), or a combination of both. In one illustrative example, method 500 may be performed by device register module 128 of hypervisor 125 in FIG. 1. Alternatively, some or all of method 500 might be performed by another component or module. It should be noted that blocks depicted in FIG. 5 could be performed simultaneously or in a different order than that depicted.

At block 501, processing logic receives the number of read only bits read from the base address register. At block 502, processing logic determines an additional number of read only bits in view of the number read only bits received from the base address register. Processing logic may increase the number of read only bits in the BAR of the virtual device to increase the size of the register space. For example, if there were initially 10 read only bits in the BAR e.g., bits 0-9), processing logic may change one or more higher bits of the BAR from read/write to read only (e.g., bits 10, 11, etc.) to increase the register size.

At block 503, processing logic determines the size of an additional extended register space in view of the additional number of read only bits. A modified BAR with 11 read only bits (e.g., bits 0-10) can provide a total combined register space of 2 kilobytes (a 1 kilobyte default register space with an additional extended register space of 1 kilobyte), a BAR with 12 read only bits (e.g., bits 0-11) can provide a total combined register space of 4 kilobytes (a 1 kilobyte default space with an additional extended register space of 3 kilobytes), etc.

At block 504, processing logic maps the additional extended register space to the assigned virtual device. This may be accomplished using a mapping table, which can be stored in a data structure in hypervisor accessible memory such as an array, a hash table, or any similar manner. The hypervisor can use the mapping table to associate the additional extended register space, beyond that which is specified in the BAR, with processing logic for para-virtual registers of the virtual device. For example, processing logic may associate the entire additional extended space with another area of physical memory (RAM), with shared RAM (e.g., so accesses can be reflected in the hypervisor or another guest), with an additional physical device available to the host, with a hypervisor function that may be executed upon request of the guest operating system, etc. In some implementations, the mapping table may map each address in the additional extended register space to a separate hypervisor functionality or device. After block 504, the method of FIG. 5 terminates.

Figure 6:
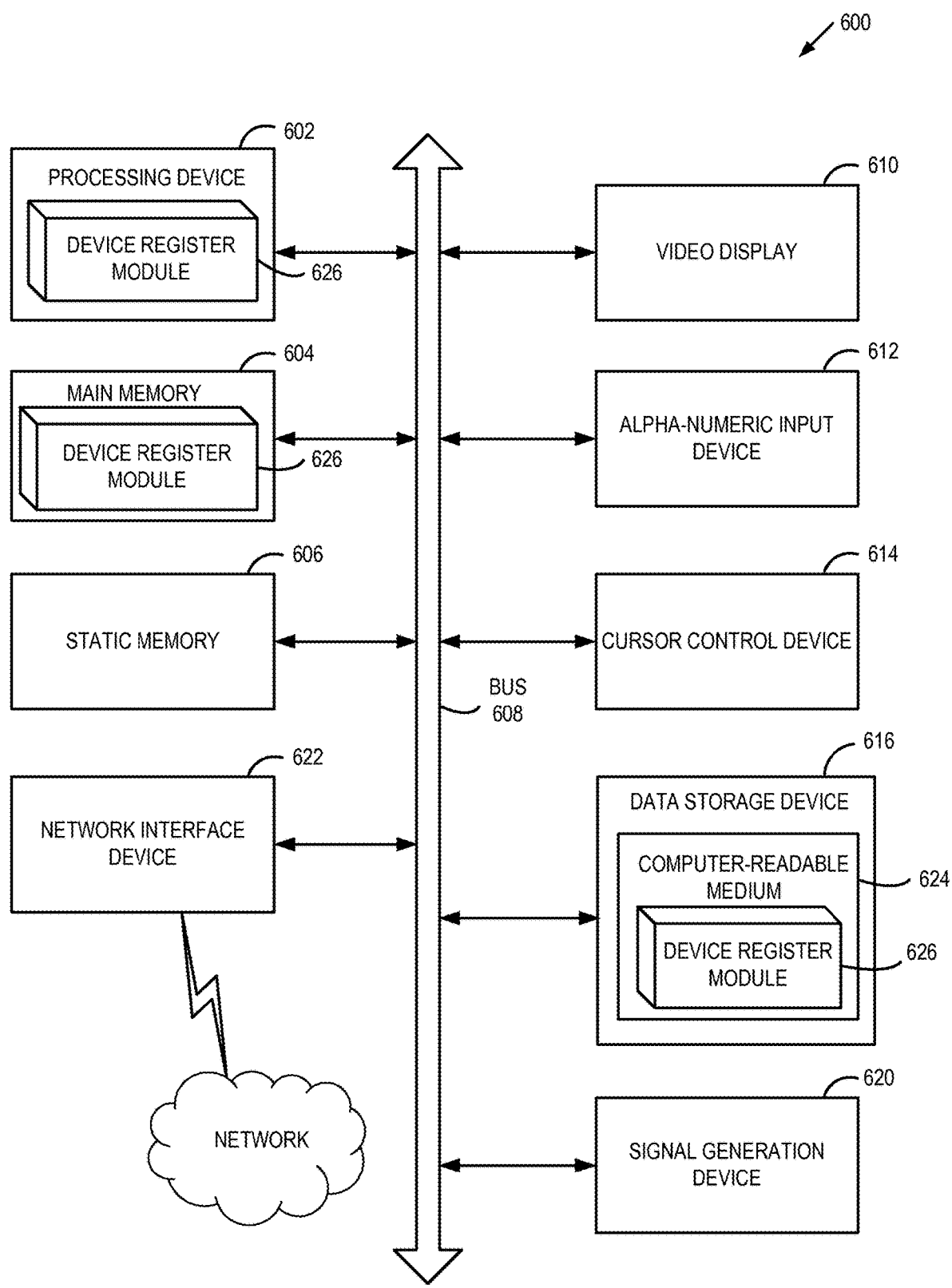
FIG. 6 depicts a block diagram of an illustrative computer system operating in accordance with examples of the invention.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute device register module 626 for performing the operations and steps discussed herein (e.g., corresponding to the methods of FIGS. 3-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a computer-readable medium 624 on which is stored device register module 626 (e.g., corresponding to the methods of FIGS. 3-5, etc.) embodying any one or more of the methodologies or functions described herein. Device register module 626 may also reside, completely or at least partially, within the main memory 604 and/or within the processing device 602 during execution thereof by the computer system 600, the main memory 604 and the processing device 602 also constituting computer-readable media. Device register module 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the than of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "associating," "determining," "detecting," "designating," "reading," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access Memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A computing apparatus comprising:
a processing device to execute a hypervisor, wherein the hypervisor is to:
determine a first number of read only bits in a base address register (BAR) of a physical device associated with a virtual machine, wherein the first number of read only bits indicate a default size of a register space associated with the physical device;
determine a size of an additional register space to be presented to a guest operating system of the virtual machine in view of a second number of read only bits and the first number of read only bits;
extend the default size of the register space by combining the first number of read only bits in the BAR with the second number of read only bits and storing the resulting combination in a mapping table accessible by the hypervisor;
map each address of the additional register space to be presented to the guest operating system of the virtual machine to a virtual device of the virtual machine using the mapping table; and
responsive to detecting an access to the additional register space by the guest operating system of the virtual machine, perform at least one hypervisor functionality, wherein the at least one hypervisor functionality comprises one or more operations to handle accesses to a corresponding address in the additional register space on behalf of the virtual machine.

2. The computing apparatus of claim 1, wherein the hypervisor is further to associate the additional register space with processing logic for para-virtual registers of the virtual device in view of the mapping table.

3. The computing apparatus of claim 2, wherein the hypervisor is further to associate the additional register space with another area of physical memory.

4. The computing apparatus of claim 2, wherein the hypervisor is further to associate the additional register space with an additional physical device available to a host.

5. The computing apparatus of claim 2, wherein the processing device is to:
identify one or more pages of memory in the additional register space as not present; and;
in response to detecting the access of the additional register space by the guest operating system, providing control to the hypervisor to perform the operation pertaining to the access of the additional register space.

6. The computing apparatus of claim 4, wherein the hypervisor is to associate the additional register space beyond that which is specified in a base address register with the additional physical device.

7. The computing apparatus of claim 6, wherein the hypervisor is to extend the size of the default register space associated with a virtual PCI device by increasing a number of read only bits in the base address register.

8. A non-transitory computer readable storage medium, having instructions stored therein, which cause a hypervisor executed by a processing device to:
determine a first number of read only bits in a base address register (BAR) of a physical device associated with a virtual machine, wherein the first number of read only bits indicate a default size of a register space associated with the physical device;
determine a size of an additional register space to be presented to a guest operating system of the virtual machine in view of a second number of read only bits and the first number of read only bits;
extend the default size of the register space by combining the first number of read only bits in the BAR with the second number of read only bits and storing the resulting combination in a mapping table accessible by the hypervisor;
map each address of the additional register space to be presented to the guest operating system of the virtual machine to a virtual device of the virtual machine using the mapping table; and
responsive to detecting an access to the additional register space by the guest operating system of the virtual machine, perform at least one hypervisor functionality, wherein the at least one hypervisor functionality comprises one or more operations to handle accesses to a corresponding address in the additional register space on behalf of the virtual machine.

9. The non-transitory computer readable storage medium of claim 8, wherein the hypervisor is further to associate the additional register space with processing logic for para-virtual registers of the virtual device in view of the mapping table.

10. The non-transitory computer readable storage medium of claim 9, wherein the default register space is associated with a virtual PCI device.

11. The non-transitory computer readable storage medium of claim 9, wherein the hypervisor is further to associate the additional register space with another area of physical memory.

12. The non-transitory computer readable storage medium of claim 9, wherein the hypervisor is further to associate the additional register space with an additional physical device available to a host.

13. The non-transitory computer readable storage medium of claim 9, wherein the processing device is further to:
identify one or more pages of memory in the additional register space as not present; and;
in response to detecting the access of the additional register space by the guest operating system, provide control to the hypervisor to perform the operation pertaining to the access of the additional register space.

14. A method comprising:
determining, by a hypervisor executed by a processing device, a first number of read only bits in a base address register (BAR) of a physical device associated with a virtual machine, wherein the first number of read only bits indicate a default size of a register space associated with the physical device;
determining, by the hypervisor, a size of an additional register space to be presented to a guest operating system of the virtual machine in view of a second number of read only bits and the first number of read only bits;
extending, by the hypervisor, the default size of the register space by combining the first number of read only bits in the BAR with the second number of read only bits and storing the resulting combination in a mapping table accessible by the hypervisor;

mapping, by the hypervisor, each address of the additional register space to be presented to the guest operating system of the virtual machine to a virtual device of the virtual machine using the mapping table; and responsive to detecting an access to the additional register space by the guest operating system of the virtual machine, performing, by the hypervisor, at least one hypervisor functionality, wherein the at least one hypervisor functionality comprises one or more operations to handle accesses to a corresponding address in the additional register space on behalf of the virtual machine.

15. The method of claim 14, further comprising:

associating the additional register space with processing logic for para-virtual registers of the virtual device in view of the map.

16. The method of claim 15, further comprising:

associating the additional register space with another area of physical memory.

17. The method of claim 15, further comprising:

associating the additional register space with an additional physical device available to a host.

18. The method of claim 15, further comprising:

identifying one or more pages of memory in the additional register space as not present; and;

in response to detecting the access of the additional register space by the guest operating system, providing control to the hypervisor to perform the operation pertaining to the access of the additional register space.

19. The method of claim 17, further comprising:

associating the additional register space beyond that which is specified in a base address register with the additional physical device.

20. The method of claim 19, further comprising:

extending the size of the default register space associated with a virtual PCI device by increasing a number of read only bits in the base address register.

* * * * *